United States Patent Office 2,915,370
Patented Dec. 1, 1959

2,915,370

PREPARATION OF GRAPHITE FROM POLY-NUCLEAR AROMATIC HYDROCARBONS

Charles V. Mitchell, Shaker Heights, Ohio, assignor to Union Carbide Corporation, a corporation of New York No Drawing. Application October 3, 1955
Serial No. 538,261

2 Claims. (Cl. 23—209.1)

The present invention relates to a process for increasing the coking value of polynuclear aromatic hydrocarbons,

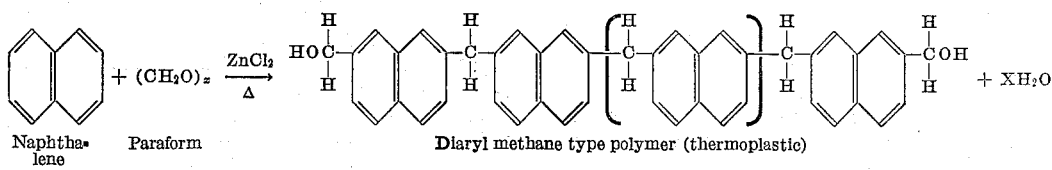

Naphthalene    Paraform    Diaryl methane type polymer (thermoplastic)

and more specifically to producing unctuous graphite therefrom.

Coal tar pitch is essentially composed of simple and substituted polynuclear aromatic hydrocarbons of varying degrees of complexity, which are soluble in benzene, and of "free carbon," i.e., that portion of the pitch which is insoluble in benzene. Naphthalene, anthracene, and phenanthrene are representatives of the former group, which will not yield coke when heated at atmospheric pressure because they are stable and normally volatile hydrocarbons.

It now has been found that the coking value of volatile polynuclear aromatic hydrocarbons normally present in coal tar pitch can be increased by reacting them with resin-forming agents in an acid catalyzed medium. The resultant resins can be coked, calcined and graphitized to give a soft, truly unctuous, and highly crystalline synthetic graphite.

The steps in the present process, including coking, are performed at atmospheric pressure. In this manner the necessity of using high pressure conditions to effect coking is avoided. The initial polymerization reaction proceeds in the presence of catalysts such as zinc chloride. However, these catalysts are removed before isolation of the resins, so that the improved coking value of the resins is not due to the presence of inorganic constituents resulting from the decomposition of the catalysts.

Suitable polynuclear aromatic hydrocarbon compounds employed as starting materials can possess a condensed ring structure, which is either linear or angular. Such compounds include anthracene, acenaphthene, fluorene, chrysene, naphthalene and mixtures thereof.

Resin-forming agents particularly suitable in the practice of the invention include formaldehyde in the form of paraform or trioxane, hexamethylenetetramine, pentaerytritol, maleic anhydride and phthalic anhydride.

In its preferred embodiment, an acid catalyzing medium is provided for the first step of the invention by using a mixture composed of acetic acid, acetic anhydride and toluene, with zinc chloride as a catalyst.

Typically, the resin-forming reaction proceeds as indicated below.

The following examples illustrate the successful practice of the invention.

EXAMPLE I

A mixture of 50 grams of naphthalene and 19 grams of paraform was heated in a mixture of acetic acid, acetic anhydride and toluene to which had been added zinc chloride. This mixture was polymerized by heating at 100° C. to 110° C. for eight hours. A light amber, brittle, thermoplastic resin separated from the reaction mass. It was coked at 450° C. at atmospheric pressure to give 25.7 percent of coke. This coke was calcined to 1000° C., and then was conventionally graphitized by heating to 3000° C. The thus obtained graphite was highly and truly unctuous throughout.

EXAMPLE II

The steps of Example I were repeated identically using 50 grams of phenanthrene. The coking value of the resin thus obtained was 23.4 percent.

EXAMPLE III

The same procedure was repeated using 50 grams of anthracene. The coking value of the resin obtained was 42.1 percent.

*Table I*

| Ex. | Hydrocarbon Taken | Paraform, g. | Yield Resin, Percent | | Resin C.V. at 450° C. | C.V. of Hydrocarbon | Remarks |
|---|---|---|---|---|---|---|---|
| | | | (A) | (B) | | | |
| | | | | | Percent | Percent | |
| 1 | 50.0 g. Naphthalene | 19.0 | 104.5 | 76.8 | 25.7 | 0.0 | Light amber brittle resin. |
| 2 | 50.0 g. Phenanthrene | 19.0 | 94.1 | 68.2 | 23.4 | 0.25 | Dark, almost black brittle resin. |
| 3 | 50.0 g. Anthracene | 19.0 | 80.3 | 58.1 | 42.1 | 0.5 | Reddish-amber brittle resin. |

(A) Based on hydrocarbon only.
(B) Based on hydrocarbon+paraform.

The data of Example I to III is presented in tabular form in Table I. This table also illustrates conclusively the increase in coking value obtained by the practice of the invention. This is obvious from a comparison of the coking value of the parent hydrocarbon and that of the resinous product. Respectively, in the case of the naphthalene, phenanthrene and anthracene, this increase is one of 25.7 percent, 23.15 percent and 41.6 percent.

While the present invention has been illustrated by way of examples involving single polynuclear compounds, its method is applicable to mixtures of the same. Further, the method is applicable to pitch and particularly to soft pitches and tars which have relatively low coking values and contain a sufficient percentage of polynuclear aromatic hydrocarbons to dissolve in the solvent medium of the invention.

The exact mechanism whereby the coking value of these hydrocarbons is increased is not known, but it is undoubtedly associated with the increase in molecular weight which results from linking together of such hydrocarbons by means of methylene bridges. It is a well known fact that molecules of high molecular weight are more prone to undergo cracking, and to give rise to coke, then molecules of low molecular weight.

What is claimed is:

1. A process for producing unctuous graphite from polynuclear aromatic hydrocarbons having a plurality of condensed rings normally present in pitch and tars, which process consists in mixing said hydrocarbons with at least one resin-forming agent selected from the group consisting of formaldehyde, paraform, trioxane, hexamethylenetetramine and pentaerythritol, introducing said mixture into an acid catalyzed medium composed of acetic acid and acetic anhydride in toluene with a zinc chloride catalyst, heating said medium to polymerize and resinify the constituents therein, separating said product from said catalyzed medium, coking said product at atmospheric pressure, graphitizing the thus formed coke at a temperature higher than the temperature at which said coking is effected to convert the carbon to unctuous graphite.

2. A process for increasing the coking value of anthracene and for producing unctuous graphite therefrom, which process consists in mixing said anthracene with formaldehyde, introducing the resulting mixture into an acid catalyzed medium consisting of acetic acid and acetic anhydride in toluene with a zinc chloride catalyst, heating said medium at about 100° C. for about eight hours to polymerize and resinify the anthracene contained therein, separating the resinous product thus formed from said catalyzed medium, coking said product at atmospheric pressure, calcining the resulting product and graphitizing the calcined material by heating to a temperature greater than that at which said coking is effected.

References Cited in the file of this patent

UNITED STATES PATENTS

| | | |
|---|---|---|
| 598,549 | Wing | Feb. 8, 1889 |
| 898,307 | Bohn | Sept. 8, 1908 |
| 1,156,509 | Weintraub et al. | Oct. 12, 1915 |
| 2,302,403 | Tetley | Nov. 17, 1942 |
| 2,655,433 | Gardner | Oct. 13, 1953 |
| 2,697,028 | Baker | Dec. 14, 1954 |
| 2,780,527 | Marisic et al. | Feb. 5, 1957 |